(12) United States Patent
Chan et al.

(10) Patent No.: US 10,782,919 B2
(45) Date of Patent: Sep. 22, 2020

(54) COMMAND PROCESSING METHOD AND STORAGE CONTROLLER USING THE SAME

(71) Applicant: Shenzhen EpoStar Electronics Limited CO., Shenzhen (CN)

(72) Inventors: Ke-Wei Chan, Hsinchu (TW); Di-Hsien Ngu, Hsinchu County (TW); Hung-Chih Hsieh, Hsinchu County (TW)

(73) Assignee: Shenzhen EpoStar Electronics Limited CO., Shenzhen (CN)

( * ) Notice: Subject to any disclaimer, the term of this patent is extended or adjusted under 35 U.S.C. 154(b) by 203 days.

(21) Appl. No.: 16/184,928

(22) Filed: Nov. 8, 2018

(65) Prior Publication Data

US 2020/0081654 A1    Mar. 12, 2020

(30) Foreign Application Priority Data

Sep. 6, 2018 (TW) .............................. 107131366 A

(51) Int. Cl.
*G06F 12/00* (2006.01)
*G06F 13/00* (2006.01)
*G06F 13/28* (2006.01)
*G06F 3/06* (2006.01)
*G06F 9/38* (2018.01)
*G06F 9/48* (2006.01)

(52) U.S. Cl.
CPC .......... *G06F 3/0659* (2013.01); *G06F 3/0604* (2013.01); *G06F 3/0679* (2013.01); *G06F 9/3855* (2013.01); *G06F 9/4881* (2013.01)

(58) Field of Classification Search
CPC ..... G06F 3/0659; G06F 9/3855; G06F 9/4881
USPC .......................................................... 711/154
See application file for complete search history.

(56) References Cited

U.S. PATENT DOCUMENTS

| 5,519,847 A | 5/1996 | Fandrich et al. |
| 8,484,408 B2 | 7/2013 | Hetzler et al. |

(Continued)

OTHER PUBLICATIONS

"Office Action of Taiwan Counterpart Application," dated Sep. 23, 2019, p. 1-p. 3.

(Continued)

*Primary Examiner* — Michael Alsip
*Assistant Examiner* — Sidney Li
(74) *Attorney, Agent, or Firm* — JCIPRNET

(57) ABSTRACT

A command processing method and a storage controller are provided. The command processing method includes performing a command merging process on commands sequentially received by a command queue. The command merging process includes an initialization step and multiple iterations. The initialization step includes transmitting the commands from the command queue to a continuity checking pool (CCP), transmitting an initial command of the commands from the CCP to a continuity list (CL) and setting a range of the CL. Each of the iterations includes transmitting the commands from the command queue to the CCP; determining whether the commands in the CCP and the range of the CL conform to a continuity condition; and when the commands in the CCP and the range conform to the continuity condition, appending the first command to the CL and resetting the range of the CL according to the first command.

14 Claims, 4 Drawing Sheets

(56) References Cited

U.S. PATENT DOCUMENTS

2009/0172264 A1* 7/2009 Chung .................. G06F 3/0659
                                                        711/103
2009/0313402 A1* 12/2009 Nara ................... G06F 13/4059
                                                        710/52
2010/0058022 A1   3/2010 Lu
2015/0169449 A1*  6/2015 Barrell ................ G06F 12/0806
                                                        711/143

OTHER PUBLICATIONS

Feng Chen et al.,"Understanding Intrinsic Characteristics and System Implications of Flash Memory based Solid State Drives", ACM SIGMETRICS/Performance'09, Jun. 15-19, 2009, pp. 1-12.

* cited by examiner

FIG. 3

FIG. 4A — Conventional command processing method

| C  | LBA |
|----|-----|
| C0 | 8   |
|    | 9   |
| C1 | 5   |
| C2 | 10  |
|    | 11  |
| C3 | 2   |
|    | 3   |
| C4 | 6   |
|    | 7   |
| C5 | 13  |
|    | 14  |
| C6 | 12  |
| C7 | 17  |
|    | 18  |
|    | 19  |
| C8 | 1   |
| C9 | 14  |
|    | 15  |
|    | 16  |

FIG. 4B — Command processing method of the invention (CCP size=4)

| P | C  | LBA |
|---|----|-----|
| 1 | C1 | 5   |
|   | C4 | 6   |
|   |    | 7   |
|   | C0 | 8   |
|   |    | 9   |
|   | C2 | 10  |
|   |    | 11  |
|   | C6 | 12  |
|   | C5 | 13  |
|   |    | 14  |
| 2 | C8 | 1   |
|   | C3 | 2   |
|   |    | 3   |
| 3 | C9 | 14  |
|   |    | 15  |
|   |    | 16  |
|   | C7 | 17  |
|   |    | 18  |
|   |    | 19  |

FIG. 4C — Command processing method of the invention (CCP size=2)

| P | C  | LBA |
|---|----|-----|
| 1 | C0 | 8   |
|   |    | 9   |
|   | C2 | 10  |
|   |    | 11  |
| 2 | C1 | 5   |
|   | C4 | 6   |
|   |    | 7   |
| 3 | C3 | 2   |
|   |    | 3   |
| 4 | C6 | 12  |
|   | C5 | 13  |
|   |    | 14  |
| 5 | C9 | 14  |
|   |    | 15  |
|   |    | 16  |
|   | C7 | 17  |
|   |    | 18  |
|   |    | 19  |
| 6 | C8 | 1   |

COMMAND PROCESSING METHOD AND STORAGE CONTROLLER USING THE SAME

CROSS-REFERENCE TO RELATED APPLICATION

This application claims the priority benefit of Taiwan application serial no. 107131366, filed on Sep. 6, 2018. The entirety of the above-mentioned patent application is hereby incorporated by reference herein and made a part of this specification.

BACKGROUND

1. Technology Field

The invention relates to a command processing method and a storage controller using the same. More particularly, the invention relates to a command processing method and a storage controller using the same that can sort commands for accessing consecutive addresses.

2. Description of Related Art

A general type storage controller, when processing host commands, usually executes the commands according to an order of the commands received from the host. When the host is to access a file, it may transmit a single input/output (IO) command for corresponding to a total transfer size of the file or a plurality of IO commands respectively corresponding to smaller transfer sizes of the file. In comparison with the scenario of the plurality of IO commands, required data buffers can be managed more easily by firmware in the scenario of single one IO command.

In an aspect of storage media access, data having consecutive logic block addresses usually can be stored in consecutive or adjacent physical addresses of storage media. When the host transfers data to a storage device, the continuity of more logic blocks can achieve shorter media access delay and less burden in the media data management for the storage device.

In a system architecture supporting out of order command execution, the storage controller may not have to execute commands according to the order of the commands received from the host. Thus, how to rearrange the host commands to increase the continuity of the logic blocks accessed by the commands is a target that technicians of this field make effort for.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention provides a command processing method and a storage controller using the same which can enhance continuity of logic blocks accessed by host commands.

A command processing method provided by the invention is applicable to a storage controller configured to access a storage medium and is coupled to a host system. The command processing method includes: selecting a command queue from a read command queue and a write command queue and performing a command merging process on commands sequentially received by the command queue, wherein each of the commands includes a starting logic block address and an ending logic block address. The command merging process includes an initialization step and a plurality of iterations. The initialization step includes: transmitting the commands from the command queue to a continuity checking pool (CCP); transmitting an initial command among the commands from the CCP to a continuity list (CL); and setting a range of the CL to between the starting logic block address and the ending logic block address of the initial command. Each of the iterations includes: transmitting the commands from the command queue to the CCP; determining whether the commands in the CCP and the range of the CL conform to a continuity condition; and when a first command among the commands and the range conform to the continuity condition, appending the first command to the CL and resetting the range of the CL according to the first command.

In an embodiment of the invention, wherein when a starting logic block address of the first command is equal to the ending logic block address of the CL added by 1, or an ending logic block address of the first command is equal to the starting logic block address of the CL subtracted by 1, the first command and the range of the CL conform to the continuity condition.

In an embodiment of the invention, the command processing method further includes: when the command merging process is completed, sequentially executing the commands of the CL.

In an embodiment of the invention, a condition to complete the command merging process is that: none of the commands in the CCP and the range of the CL are consecutive in one of the iterations.

In an embodiment of the invention, a condition to complete the command merging process is that: one of the iterations is completed, and a cumulative number of the iterations is equal to a predetermined number.

In an embodiment of the invention, a condition to complete the command merging process is that: a timer expires, wherein the timer starts when the command merging process starts.

In an embodiment of the invention, in each of the iterations, the number of the commands transmitted to the CCP is less than a maximum number of the commands in the CCP subtracted by the number of the commands in the CCP.

A storage controller provided by the invention is configured to access storage media and is coupled to a host system. The storage controller includes a command dispatcher, a command scheduler, an arbiter and a processor. The command dispatcher dispatches a plurality of read commands to a read command queue and dispatches a plurality of write commands to a write command queue. The command scheduler is coupled to the command dispatcher. An arbiter is coupled to the command scheduler. The processor is coupled to at least one of the command dispatcher, the command scheduler and the arbiter. The arbiter selects a command queue from the read command queue and the write command queue. The command scheduler performs a command merging process on commands sequentially received by the command queue. Each of the commands includes a starting logic block address and an ending logic block address. The command merging process includes an initialization step and a plurality of iterations. The initialization step includes: transmitting the commands from the command queue to a CCP by the command scheduler; transmitting an initial command among the commands from the CCP to a CL; and setting a range of the CL to between a starting logic block address and an ending logic block address of the initial command. Each of the iterations includes: transmitting the commands from the command queue to the CCP by the command scheduler; determining whether the commands in the CCP and the range of the CL conform to a continuity condition; and when a first command among the commands and the range conform to the continuity condition, appending the first command to the CL and resetting the range of the CL according to the first command.

In an embodiment of the invention, wherein when a starting logic block address of the first command is equal to the ending logic block address of the CL added by 1, or an ending logic block address of the first command is equal to the starting logic block address of the CL subtracted by 1, the first command and the range of the CL conform to the continuity condition.

In an embodiment of the invention, the command processing method further includes: when the command merging process is completed, the processor sequentially executes the commands of the CL.

In an embodiment of the invention, a condition to complete the command merging process is that: none of the commands in the CCP and the range of the CL are consecutive in one of the iterations.

In an embodiment of the invention, a condition to complete the command merging process is that: one of the iterations is completed, and a cumulative number of the iterations is equal to a predetermined number.

In an embodiment of the invention, a condition to complete the command merging process is that: a timer expires, wherein the timer starts when the command merging process starts.

In an embodiment of the invention, in each of the iterations, the number of the commands transmitted to the CCP is less than a maximum number of the commands in the CCP subtracted by the number of the commands in the CCP.

To sum up, the command processing method and the storage controller using the same provided by the invention can achieve dispatching the commands received from the host to the read command queue and the write command queue and selecting a command queue from the read command queue and the write command queue. In the initialization step of the command merging process, the initial command is transmitted to the CL, and the range of the CL is set to between the starting logic block address and the ending logic block address of the initial command. In the plurality of iterations of the command merging process, when one of the commands and the range of the CL conform to the continuity condition, the command is appended to the CL, and the range of the CL is reset according to the command. When the command merging process is completed, the processor sequentially executes the commands of the CL to access the consecutive logic block addresses. It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 illustrates an example of the command merging process according to an embodiment of the invention.

FIG. 4A illustrates command continuity of the command processing method of the related art.

FIG. 4B illustrates command continuity of the command processing method according to an embodiment of the invention.

FIG. 4C illustrates command continuity of the command processing method according to another embodiment of the invention.

DESCRIPTION OF EMBODIMENTS

Figure 1:
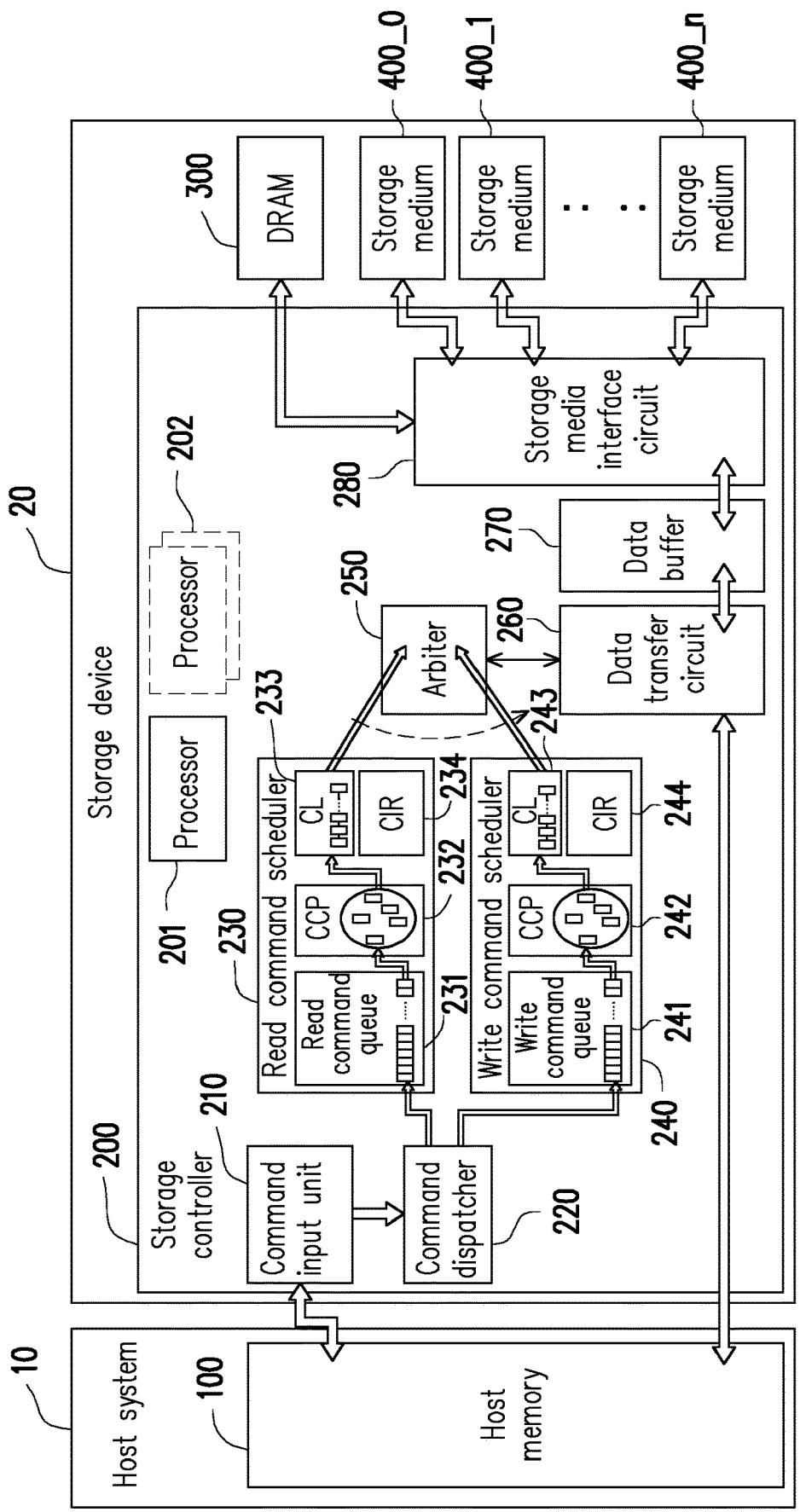
FIG. 1 is a block diagram of a host system and a storage device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a storage device includes a rewritable non-volatile memory module and a storage device controller (also referred to as a storage controller or a storage control circuit). The storage device is usually used together with a host system, such that the host system can write data to the storage device or read data from the storage device.

FIG. 1 is a block diagram of a host system and a storage device according to an embodiment of the invention.

Referring to FIG. 1, a host system 10 includes a host processor (which is not shown), a host memory 100 and a data transfer interface circuit (which is not shown). In the present embodiment, the data transfer interface circuit is coupled (i.e., electrically connected) to the host processor and the host memory 100. In another embodiment, the host processor, the host memory 100 and the data transfer interface circuit are coupled to one another through a system bus.

A storage device 20 includes a storage controller 200, a dynamic random access memory (DRAM) 300, storage media 400_0 to 400_n, and a connection interface circuit (which is not shown). The storage media 400_0 to 400_n may be rewritable non-volatile memory modules.

In the present embodiment, the host system 10 is coupled to the storage device 20 through the data transfer interface circuit and the connection interface circuit of the storage device 20 (also known as a host interface of the storage device 20) to perform a data access operation. For example, the host system 10 may store data into the storage device 20 or read data from the storage device 20 through the data transfer interface circuit.

In the present embodiment, the host processor, the host memory 100 and the data transfer interface circuit may be disposed on a main board of the host system 10. A quantity of the data transfer interface circuit may be one or more. Through the data transfer interface circuit, the main board may be coupled to the storage device 20 in a wired manner or a wireless manner. The storage device 20 may be, for example, a flash drive, a memory card, a solid state drive (SSD) or a wireless memory storage device. The wireless memory storage device may be, for example, a memory storage device based on various wireless communication technologies, such as a Near Field Communication (NFC) memory storage device, a Wireless Fidelity (WiFi) memory storage device, a Bluetooth memory storage device, a Bluetooth low energy (BLE) memory storage device (e.g., iBeacon). Further, the host system 10 may also be coupled to various I/O devices including a Global Positioning System (GPS) module, a network interface card, a wireless transmission device, a keyboard, a monitor and a speaker through the system bus.

In the present embodiment, the data transfer interface circuit and the connection interface circuit are interface circuits compatible with a Peripheral Component Interconnect Express (PCI Express) interface standard. Further, a data transmission is performed between the data transfer interface circuit and the connection interface circuit by using a Non-Volatile Memory express (NVMe) interface, an Advanced Host Controller Interface (AHCI) or a PCIe architecture Queuing Interface (PQI) protocols, and can include an out-of-order execution (OOE) feature. Here, the NVMe protocol can include Input/Output Submission Queue (IOSQ) and Input/Output Completion Queue (IOCQ) architectures, the AHCI protocol can include a Native Command Queue (NCQ) support, and the PQI protocol can include Input Queue (IQ) and Output Queue (OQ) architectures.

Nevertheless, it should be understood that the invention is not limited to the above. The data transfer interface circuit and the connection interface circuit may also be compatible to a PATA (Parallel Advanced Technology Attachment) standard, an IEEE (Institute of Electrical and Electronic Engineers) 1394 standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC interface standard, a UFS (Universal Flash Storage) interface standard, an eMCP interface standard, a CF interface standard, an IDE (Integrated Device Electronics) interface standard or other suitable standards. Further, in another embodiment, the connection interface circuit and the storage controller 200 may be packaged into one chip, or the connection interface circuit is distributed outside a chip containing the storage controller 200.

In the present embodiment, the host memory 100 is configured to temporarily store commands executed by the host processor or data. For instance, in the present exemplary embodiment, the host memory 100 may be a Dynamic Random Access Memory (DRAM), or a Static Random Access Memory (SRAM) and the like. Nevertheless, it should be understood that the invention is not limited thereto, and the host memory 100 may also be other appropriate memories.

In the present embodiment, the storage controller 200 includes a processor 201, a command input unit 210, a command dispatcher 220, a read command scheduler 230, a write command scheduler 240 and an arbiter 250. The processor 201 is in charge of host IO command processing. Besides the processor 201, the storage controller 200 may further include one or more processors 202 in charge of command processing other than the host IO command processing.

When the command input unit 210 receives a plurality of commands from the host memory 100, the command input unit 210 transmits the commands to the command dispatcher 220. The command dispatcher 220 categorizes the commands into read commands and write commands and dispatches the read commands to a read command queue 231 of the read command scheduler 230 and dispatches the write commands to a write command queue 241 of the write command scheduler 240. The arbiter 250 selects a read command group from the read command scheduler 230 or a write command group from the write command scheduler 240 according to a predefined arbitration mechanism and executes the read command group or the write command group as selected.

A method for selecting the write command group will be described below. When the arbiter 250 selects the write command group, the write command scheduler 240 starts to perform a command merging process. The write command scheduler 240 loads the write commands from the write command queue 241 into a continuity checking pool (CCP) 242. The CCP 242 may be a buffer memory, and the write commands stored in the CCP 242 have no specific ordering. Then, the write command scheduler 240 checks whether the write commands in the CCP 242 is capable of being appended to a continuity list (CL) 243. The CL 243 records the write commands of one to a plurality of consecutive logic block addresses, and a continuity information recorder (CIR) 244 records a starting logic block address (SLBA) and an ending logic block address (ELBA) of the consecutive write commands in the CL 243. If there is a write command in the CCP 242 capable of being appended to the head of the CL 243 or to the tail of the CL 243, the write command scheduler 240 appends the write command to the CL 243 and updates the SLBA and the ELBA of the CIR 244.

For example, when a write command is appended to the head of the CL 243, the SLBA of the CIR 244 is updated as an SLBA of the write command which is appended to the head of the CL 243. When a write command is appended to the tail of the CL 243, the ELBA of the CIR 244 is updated as an ELBA of the write command which is appended to the tail of the CL 243.

It should be noted that when no write command is in the CL 243, the write command scheduler 240 may randomly select a write command from the CCP 242 and transmit it to the CL 243, and the SLBA and the ELBA of the CIR 244 are initialized as an SLBA and an ELBA of the randomly selected write command. In another embodiment, when there is no write command in the CL 243, the write command scheduler 240 may also select a write command which is first popped from the CCP 242 and transmit it to the CL 243.

After the write command in the CCP 242 is appended to the CL 243, and the CIR 244 is updated, an iteration operation is completed. The write command scheduler 240 may perform a plurality of iteration operations to transmit consecutive write commands from the CCP 242 to the CL 243. In an embodiment, when the write command scheduler 240 no longer finds any write command capable of being appended to the CL 243 in the CCP 242, the command merging process is completed. The processor 201 sequentially performs the write commands in the CL 243 and starts data transfer corresponding to the write commands. In another embodiment, a condition to complete the command merging process may be set as one of the iteration operations being completed, and a cumulative number of the iteration operations being equal to a predetermined number. In another embodiment, a condition to complete the command merging process may be set as a timer expiring, where the timer starts when the command merging process starts.

A method for selecting the read command group is similar to that of selecting the write command group and thus, will not be repeatedly described.

In the present embodiment, the storage controller 200 further includes a data transfer circuit 260, a data buffer 270 and a storage media interface circuit 280. When a command is executed, the data transfer circuit 260 is configured to be instructed by the processor 201 for data transfer with the host memory 100. For example, data is read from the host system 10 (for example, the host memory 100) through the connection interface circuit, the data read from the host system 10 is temporarily stored in the data buffer 270, and the read data is then written into the storage media 400_0 to 400_n through the storage media interface circuit 280. Moreover, the data is read from the storage media 400_0 to 400_n through the storage media interface circuit 280, and the read data is written into the host system 10 (for example, the host memory 100) through the connection interface circuit. The storage media interface circuit 280 is configured to be instructed by the processor 201 to perform a writing operation (also referred to as a programming operation) or a reading operation on the data of the storage media 400_0 to 400_n in collaboration with the data transmission circuit 260. The storage media interface circuit 280 may also perform an erasing operation on the storage media 400_0 to 400_n. Additionally, the data written into the storage media 400_0 to 400_n through the storage media interface circuit 280 may be temporarily stored in the DRAM 300, and the data read from the storage media 400_0 to 400_n through the storage media interface circuit 280 may also be temporarily stored in the DRAM 300.

Figure 2:
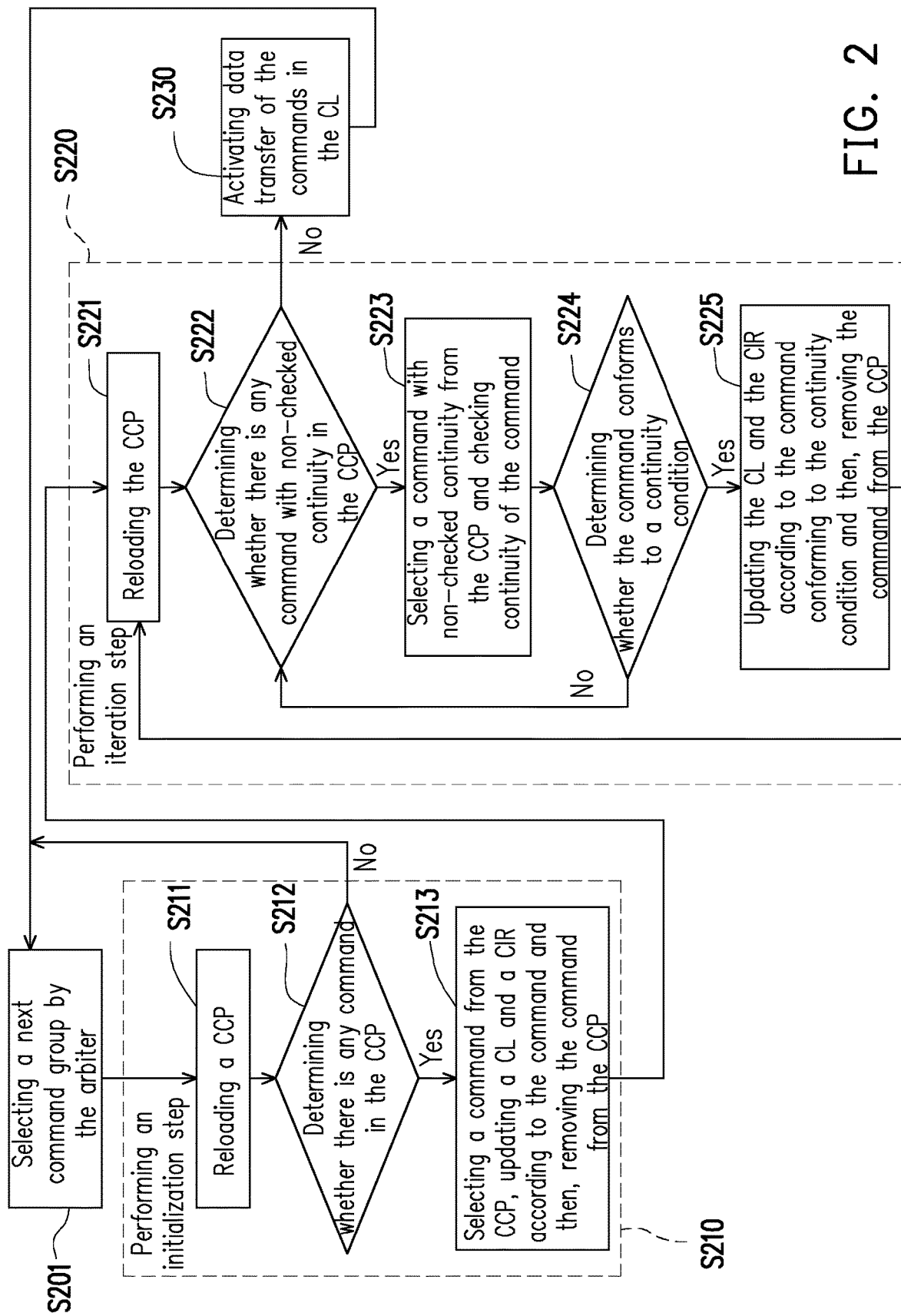
FIG. 2 is a flowchart of a command merging process according to an embodiment of the invention.

It should be noted that the command input unit 210, the command dispatcher 220, the read command scheduler 230, the write command scheduler 240 and the arbiter 250 may be implemented in a form of hardware circuit or firmware. FIG. 2 is a flowchart of a command merging process according to an embodiment of the invention.

Referring to FIG. 2, in step S201, the arbiter 250 selects a next command group. The command group referred to in this case may respectively correspond to the read command group in the read command scheduler 230 or the write command group in the write command scheduler 240.

In step S210, an initialization step is performed.

In step S211, a CCP is reloaded.

In step S212, whether there is any command in the CCP is determined. If there are commands in the CCP, step S213 is entered. If there is no command in the CCP, step S201 is returned to.

In step S213, a command is selected from the CCP, a CL and a CIR are updated according to the command, and then, the command is removed from the CCP.

In step S220, an iteration step is performed.

In step S221, the CCP is reloaded.

In step S222, whether there is any command with non-checked continuity in the CCP is determined. If there is no command with non-checked continuity in the CCP, step S230 is entered, and data transfer of the commands in the CL is activated. If there are commands with non-checked continuity in the CCP, step S223 is entered.

In step S223, a command with non-checked continuity is selected from the CCP, and continuity of the command is checked.

In step S224, whether the command conforms to a continuity condition is determined. If the command does not conform to the continuity condition, step S222 is returned to. If the command conforms to the continuity condition, step S225 is entered.

In step S225, the CL and the CIR are updated according to the command conforming to the continuity condition, and then, the command is removed from the CCP.

Table 1 shows 10 commands $C_0$, $C_1$, ... and $C_9$ sequentially received by a command queue (which may be the read command queue 231 or the write command queue 241) from the command dispatcher 220. A logic block address (LBA) range of each command is 1 to 3. Table 1 exhibits information related to a starting logic block address (SLBA), a number of logic blocks and an ending logic block address of each command.

TABLE 1

|  | SLBA | NLB | ELBA |
| --- | --- | --- | --- |
| $C_0$ | 8 | 1 | 9 |
| $C_1$ | 5 | 0 | 5 |
| $C_2$ | 10 | 1 | 11 |
| $C_3$ | 2 | 1 | 3 |
| $C_4$ | 6 | 1 | 7 |
| $C_5$ | 13 | 1 | 14 |
| $C_6$ | 12 | 0 | 12 |
| $C_7$ | 17 | 2 | 19 |
| $C_8$ | 1 | 0 | 1 |
| $C_9$ | 14 | 2 | 16 |

Figure 3:
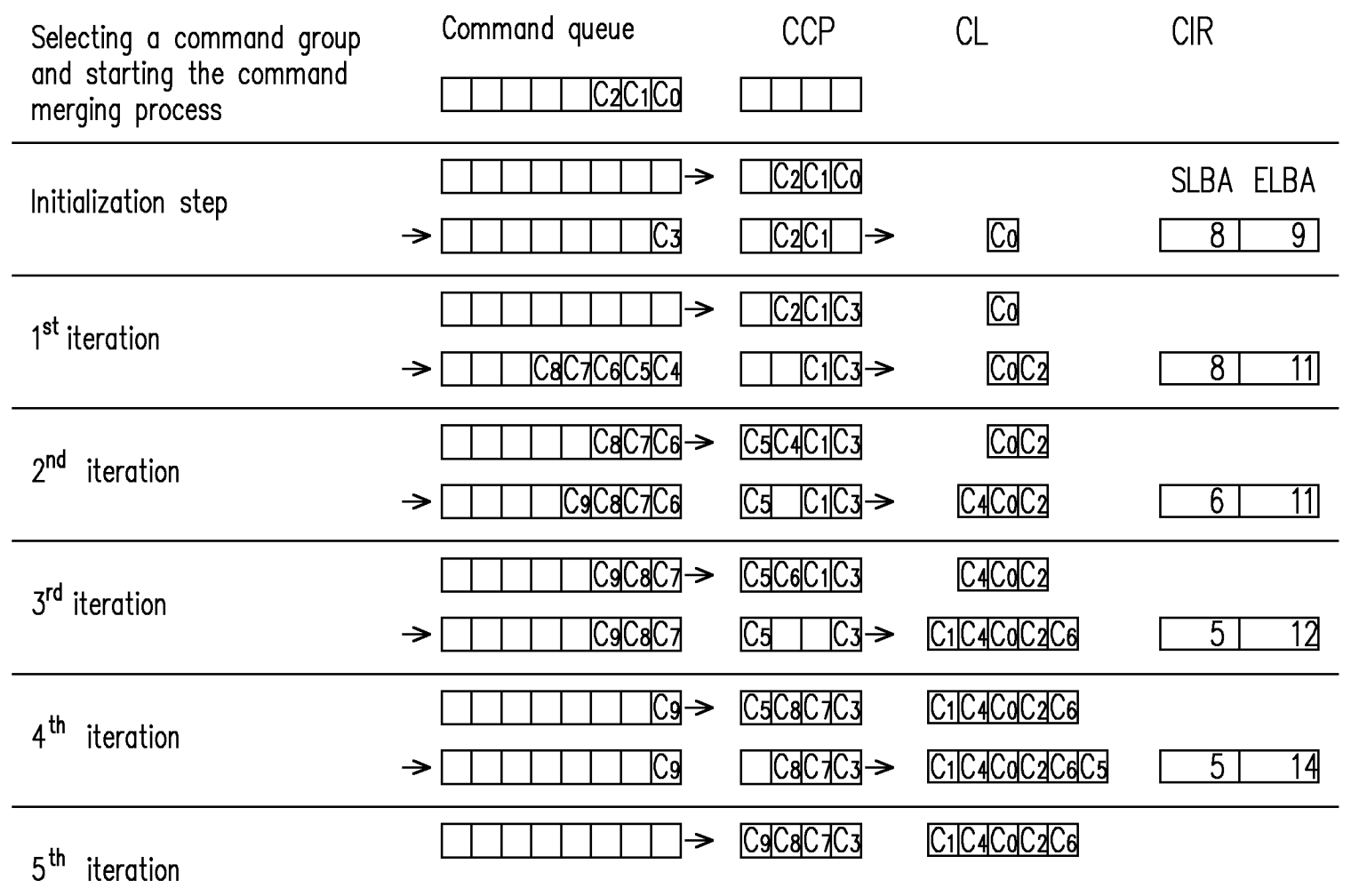

FIG. 3 illustrates an example of the command merging process according to an embodiment of the invention.

Referring to FIG. 3, a size of a buffer memory of a CCP is 4. Namely, the CCP is capable of temporarily storing up to 4 commands.

Refer to FIG. 3 and Table 1 simultaneously. First, after the arbiter 250 selects a command group and starts the command merging process, the commands $C_0$, $C_1$ and $C_2$ are sequentially transferred to a command queue.

In an initialization step, the commands $C_0$, $C_1$ and $C_2$ are transmitted from the command queue to the CCP. A CL is initialized as $C_0$, an SLBA field and an ELBA field of a CIR are respectively initialized as an SLBA and an ELBA of $C_0$, i.e., 8 and 9. In the meantime, a new command $C_3$ is received by the command queue.

In a first iteration, the command $C_3$ is loaded into the CCP (i.e., reloaded into the CCP). Since the command $C_2$ conforms to a continuity condition, the command $C_2$ is removed from the CCP and appended to the tail of the CL. The ELBA field of the CIR is updated as 11. In the meantime, new commands $C_4$, $C_5$, $C_6$, $C_7$ and $C_8$ are received by the command queue.

It should be noted that in the present embodiment, when an SLBA of a command is equal to the ELBA of the CIR added by 1 (i.e., ELBA+1), or an ELBA of the command is equal to the SLBA of the CIR subtracted by 1 (i.e., SLBA−1), the command conforms to the continuity condition.

In a second iteration, the commands $C_4$ and $C_5$ are loaded into the CCP. Since the command $C_4$ conforms to the continuity condition, the command $C_4$ is removed from the CCP and appended to the head of the CL. The SLBA field of the CIR is updated as 6. In the meantime, a new command $C_9$ is received by the command queue.

In a third iteration, the command $C_6$ is loaded into the CCP. Since the commands $C_1$ and $C_6$ conform to the continuity condition, the command $C_1$ is removed from the CCP and appended to the head of the CL, and the command $C_6$ is removed from the CCP and appended to the tail of the CL. The SLBA field of the CIR is updated as 5, and the ELBA field is updated as 12. It should be noted that even though only one command is appended to the CL in one iteration in the embodiment illustrated in FIG. 2, the invention is not limited thereto. In another embodiment, it may also be two commands appended to the CL in one iteration. For example, in the third iteration of the present example, since both the commands $C_1$ and $C_6$ conform to the continuity condition, the commands $C_1$ and $C_6$ are appended to the head and the tail of the CL, respectively.

In a fourth iteration, the commands $C_7$ and $C_8$ are loaded from the command queue to the CCP. Since the command $C_5$ conforms to the continuity condition, the command $C_5$ is removed from the CCP and appended to the tail of the CL. The ELBA field of the CIR is updated as 14.

In a fifth iteration, the command $C_9$ is loaded from the command queue to the CCP. Since no command in the CCP conforms to the continuity condition, the command merging process ends, and the processor activates data transfer corresponding to the commands in the CL.

FIG. 4A through FIG. 4C show the comparison of continuity between the command processing method of the related art and the command processing method according to the embodiments of the invention.

In FIG. 4A, the commands $C_0$ to $C_9$ are sequentially executed, which results in discontinuity of the logic block addresses accessed by the commands during the execution process.

In FIG. 4B, it shows that when the size of the CCP (which is the number of commands capable of being stored in the CCP) is set to 4, the commands $C_0$ to $C_9$ are grouped into 3 consecutive groups of the logic block addresses, which may enhance efficiency of the command execution. P represents a Pth command merging process.

In FIG. 4C, it shows that when the size of the CCP is set to 2, the commands $C_0$ to $C_9$ are grouped into 6 consecutive groups of the logic block addresses. According to the comparisons illustrated in FIG. 4B and FIG. 4C, the execution effect of the command merging process can be improved if the size of the CCP is increased by using more resources.

In light of the foregoing, the command processing method and the storage controller using the same provided by the invention can achieve dispatching the commands received from the host to the read command queue and the write command queue and selecting a command queue from the read command queue and the write command queue. In the initialization step of the command merging process, the initial command is transmitted to the CL, and the range of the CL is set to between the SLBA and the ELBA of the initial command. In the plurality of iterations of the command merging process, when one of the commands and the range of the CL conform to the continuity condition, the command is appended to the CL, and the range of the CL is reset according to the command. When the command merging process is completed, the processor sequentially executes the commands of the CL to access the consecutive logic block addresses. With the command processing method and the storage controller using the method provided by the invention, the chance of LBA continuity during the data transfer can be increased, thereby achieving shorter media access delay and less burden in the media data management. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A command processing method, applicable to a storage controller configured to access a storage medium and coupled to a host system, the command processing method comprising:
    selecting a command queue from a read command queue and a write command queue and performing a command merging process on commands sequentially received by the command queue, wherein each of the commands comprises a starting logic block address and an ending logic block address, and the command merging process comprises an initialization step and a plurality of iterations,
    wherein the initialization step comprises: transmitting the commands from the command queue to a continuity checking pool (CCP); transmitting an initial command among the commands from the CCP to a continuity list (CL); and setting a range of the CL to between the starting logic block address and the ending logic block address of the initial command,
    wherein each of the iterations comprises: transmitting the commands from the command queue to the CCP; determining whether the commands in the CCP and the range of the CL conform to a continuity condition; and when a first command among the commands conforms to the continuity condition, appending the first command to the CL and resetting the range of the CL according to the first command.

2. The command processing method according to claim 1, wherein when a starting logic block address of the first command is equal to the ending logic block address of the CL added by 1, or an ending logic block address of the first command is equal to the starting logic block address of the CL subtracted by 1, the first command and the range of CL conform to the continuity condition.

3. The command processing method according to claim 1, further comprising: when the command merging process is completed, sequentially executing the commands of the CL.

4. The command processing method according to claim 3, wherein a condition to complete the command merging process is that: none of the commands in the CCP and the range of the CL are consecutive in one of the iterations.

5. The command processing method according to claim 3, wherein a condition to complete the command merging process is that: one of the iterations is completed, and a cumulative number of the iterations is equal to a predetermined number.

6. The command processing method according to claim 3, wherein a condition to complete the command merging process is that: a timer expires, wherein timer starts when the command merging process starts.

7. The command processing method according to claim 1, wherein in each of the iterations, the number of the commands transmitted to the CCP is less than a maximum number of the commands in the CCP subtracted by the number of the commands in the CCP.

8. A storage controller, configured to access a storage medium and coupled to a host system, comprising:
a command dispatcher, dispatching a plurality of read commands to a read command queue and dispatching a plurality of write commands to a write command queue;
a command scheduler, coupled to the command dispatcher;
an arbiter, coupled to the command scheduler; and
a processor, coupled to at least one of the command dispatcher, the command scheduler and the arbiter,
wherein the arbiter selects a command queue from the read command queue and the write command queue, the command scheduler performs a command merging process on commands sequentially received by the command queue, each of the commands comprises a starting logic block address and an ending logic block address, and the command merging process comprises an initialization step and a plurality of iterations,
wherein the initialization step comprises: transmitting the commands from the command queue to a CCP by the command scheduler; transmitting an initial command among the commands from the CCP to a CL; and setting a range of the CL to between a starting logic block address and an ending logic block address of the initial command,
wherein each of the iterations comprises: transmitting the commands from the command queue to the CCP by the command scheduler; determining whether the commands in the CCP and the range of the CL conform to a continuity condition; and when a first command among the commands and the range conform to the continuity condition, appending the first command to the CL and resetting the range of the CL according to the first command.

9. The storage controller according to claim 8, wherein when a starting logic block address of the first command is equal to the ending logic block address of the CL added by 1, or an ending logic block address of the first command is equal to the starting logic block address of the CL subtracted by 1, the first command and the range of CL conform to the continuity condition.

10. The storage controller according to claim 8, wherein when the command merging process is completed, the processor sequentially executes the commands of the CL.

11. The storage controller according to claim 10, wherein a condition to complete the command merging process is that: none of the commands in the CCP and the range of the CL are consecutive in one of the iterations.

12. The storage controller according to claim 10, wherein a condition to complete the command merging process is that: one of the iterations is completed, and a cumulative number of the iterations is equal to a predetermined number.

13. The storage controller according to claim 10, wherein a condition to complete the command merging process is that: a timer expires, wherein timer starts when the command merging process starts.

14. The storage controller according to claim 8, wherein in each of the iterations, the number of the commands transmitted to the CCP is less than a maximum number of the commands in the CCP subtracted by the number of the commands in the CCP.

* * * * *